ANDREWS & PIPER.
Clover Huller.
No. 1,894. Patented Dec. 10, 1840.
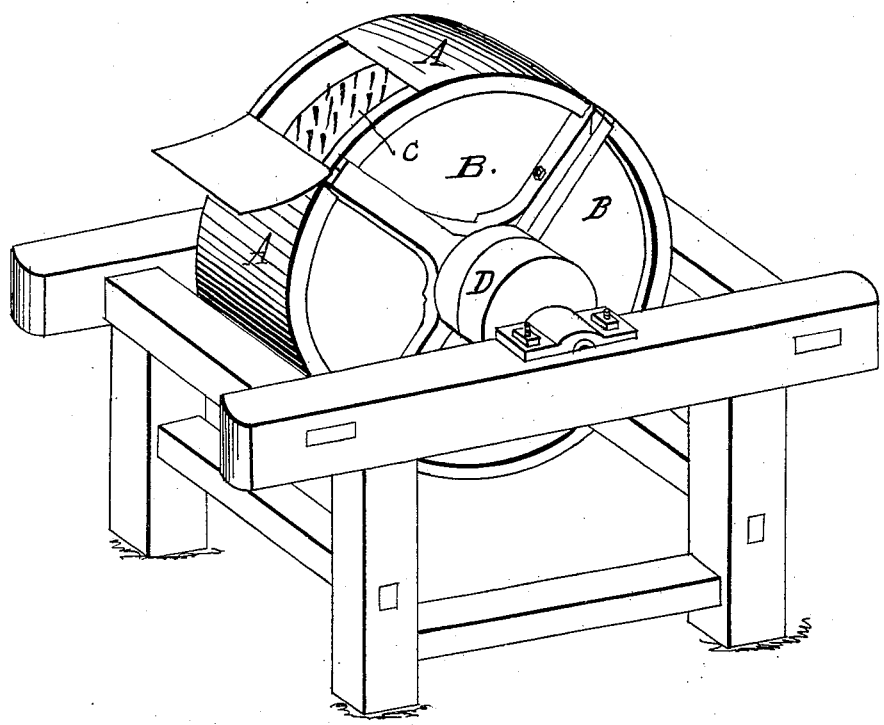

UNITED STATES PATENT OFFICE.

JAMES ANDREWS AND ENOCH PIPER, OF CAMDEN, MAINE.

MACHINE FOR HULLING OATS, BARLEY, &c.

Specification of Letters Patent No. 1,894, dated December 10, 1840.

*To all whom it may concern:*

Be it known that we, JAMES ANDREWS and ENOCH PIPER, both of Camden, in the county of Waldo and State of Maine, have invented a new and Improved Mode of Hulling Barley, Oats, Rice, &c.; and we do hereby declare that the following is a full and exact description.

Our machine in its general appearance and operation is not dissimilar to that known as the Scotch Barley Huller, having a revolving drum or disk with a revolving case. The case is constructed of sheet-iron supported on the outer side by arms and rims or fellies; is made in two parts represented in the drawing by A, A, and B, B; is about three feet in diameter, and contains the drum as seen at C, through the opening in the case made to receive the grain; the drum and case act on the same axis, the former being firmly secured to the axis, the latter allowed to turn upon it, kept in their relative positions by shoulders or other means. The drum is turned by a belt around the pulley D, and should revolve about one thousand times per minute, while the case is turned by another belt passing around it, making about fifteen revolutions per minute, both moving in the same direction. The drum is constructed of wood (instead of stone, as in the Scotch huller), with its periphery and 5 or 6 inches of its sides from the periphery, covered with sheet-iron, and having over the same surface common 6d or 8d cut nails at short intervals projecting half their length into the space between the drum and the case, which should be from two to four inches, the projecting nails of the periphery should incline backward thirty or forty degrees from a perpendicular to the axis, and those of the sides should have a corresponding arrangement. The sheet iron attached to the drum, and likewise that of the case, should be punched, so as to operate like a grater.

The principal object and utility of a hulling machine made on the foregoing principle is to prepare barley and oats in a suitable manner for culinary purposes as a substitute for rice.

The advantages of this arrangement are: 1st. The drum constructed of wood, is capable of being driven with much greater velocity, unattended with the risk consequent upon that of a stone, thereby increasing its power of execution, which in addition to the projecting nails, gives more than four-fold advantage in the power of operation over the stone. 2d. It exhibits a novel feature in regard to hulling oats (taken in the natural state), which is presumed no other machine is capable of effecting. 3d. Advantage will be realized in the transportation as well as in the diminution of friction, in proportion to the difference of weight between a drum of wood and a stone.

What we claim as our invention and improvement, is—

The manner of constructing the drum or disk of wood, sheathed with sheet iron, and armed with projecting nails, the same to revolve within a revolving case, or in other words, that portion of the combination of a revolving drum or disk with a revolving case, so far as relates entirely to the manner of constructing the drum or disk, the whole being constructed and operating in the manner set forth.

JAMES ANDREWS.
ENOCH PIPER.

Witnesses:
JOSHUA S. PAGE,
EZRA BARROW.